United States Patent
Zhao et al.

(10) Patent No.: US 12,394,250 B2
(45) Date of Patent: Aug. 19, 2025

(54) MOVEMENT EXTRACTION METHOD AND APPARATUS FOR DANCE VIDEO, COMPUTER DEVICE, AND STORAGE MEDIUM

(71) Applicant: SHANGHAI BILIBILI TECHNOLOGY CO., LTD., Shanghai (CN)

(72) Inventors: Shichen Zhao, Shanghai (CN); Weijia Li, Shanghai (CN); Chaoran Li, Shanghai (CN); Peng Wang, Shanghai (CN); Zhihui Chen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 372 days.

(21) Appl. No.: 18/018,879

(22) PCT Filed: Jun. 22, 2021

(86) PCT No.: PCT/CN2021/101384
§ 371 (c)(1),
(2) Date: Jan. 31, 2023

(87) PCT Pub. No.: WO2022/028136
PCT Pub. Date: Feb. 10, 2022

(65) Prior Publication Data
US 2023/0306787 A1    Sep. 28, 2023

(30) Foreign Application Priority Data

Aug. 6, 2020   (CN) .......................... 202010784431.7

(51) Int. Cl.
| | |
|---|---|
| *G06V 40/20* | (2022.01) |
| *G06F 18/23* | (2023.01) |
| *G06T 7/246* | (2017.01) |
| *G06V 10/762* | (2022.01) |
| *G06V 20/40* | (2022.01) |
| *A63F 13/65* | (2014.01) |
| *A63F 13/816* | (2014.01) |

(52) U.S. Cl.
CPC .............. *G06V 40/23* (2022.01); *G06F 18/23* (2023.01); *G06T 7/248* (2017.01); *G06V 10/762* (2022.01);
(Continued)

(58) Field of Classification Search
None
See application file for complete search history.

(56) References Cited

U.S. PATENT DOCUMENTS 8,448,056 B2 *   5/2013  Pulsipher ............. G06V 40/103
                                                       348/169
10,643,492 B2 *  5/2020  Lee ..................... G09B 19/0038
(Continued)

FOREIGN PATENT DOCUMENTS

| CN | 108665492 A | 10/2018 |
|---|---|---|
| CN | 109151501 A | 1/2019 |

(Continued)

OTHER PUBLICATIONS

Classification of K-Pop Dance Movements Based on Skeleton Information Obtained by a Kinect Sensor, by Kim et al., Sensors 2017, 17, 1261; doi:10.3390/s17061261 (Year: 2017).*

(Continued)

*Primary Examiner* — Vikkram Bali
(74) *Attorney, Agent, or Firm* — BakerHostetler (57) ABSTRACT

This disclosure provides techniques of extracting movements from a dance video. The techniques comprise receiving a dance video that includes one or more dancers and that is uploaded by a user, and obtaining a video frame in the dance video; recognizing, based on a skeleton node recognition algorithm, skeleton node images from the video frames corresponding to a target dancer, where the target dancer is selected from the one or more dancers; performing cluster analysis on the skeleton node images recognized (Continued)

from the dance video and corresponding to each target dancer to obtain a plurality of cluster sets; determining a cluster center in each of the plurality of cluster sets as a key skeleton node image; and sequentially outputting the key skeleton node images to obtain a standard movement sequence corresponding to each target dancer in the dance video.

20 Claims, 4 Drawing Sheets

(52) U.S. Cl.
CPC .............. *G06V 20/41* (2022.01); *A63F 13/65* (2014.09); *A63F 13/816* (2014.09); *A63F 2300/6607* (2013.01); *G06T 2207/10016* (2013.01); *G06T 2207/30196* (2013.01)

(56) References Cited

U.S. PATENT DOCUMENTS

| | | | | |
|---|---|---|---|---|
| 2007/0040836 | A1* | 2/2007 | Schickler | ............... G11B 27/10 345/473 |
| 2019/0392729 | A1 | 12/2019 | Lee et al. | |

FOREIGN PATENT DOCUMENTS

| | | |
|---|---|---|
| CN | 109308438 A | 2/2019 |
| CN | 109508656 A | 3/2019 |
| CN | 110096950 A | 8/2019 |
| CN | 110245638 A | 9/2019 |
| CN | 110448870 A | 11/2019 |
| CN | 110728220 A | 1/2020 |
| CN | 111144217 A | 5/2020 |
| WO | WO 2016/019973 A1 | 2/2016 |

OTHER PUBLICATIONS

International Patent Application No. PCT/CN2021/101384; Int'l Search Report; dated Sep. 26, 2021; 2 pages.
Zhao et al.; "Optimization and Behavior Identification of Keyframes in Human Action Video"; Journal of Graphics; vol. 39 No. 3; Jun. 2018; p. 463-469 (contains English Abstract).
China Patent Application No. 202010784431.7; First Office Action; dated Apr. 26, 2024; 24 pages.
China Patent Application No. 202010784431.7; Second Office Action; dated Aug. 13, 2024; 20 pages.

* cited by examiner

MOVEMENT EXTRACTION METHOD AND APPARATUS FOR DANCE VIDEO, COMPUTER DEVICE, AND STORAGE MEDIUM

CROSS-REFERENCE TO RELATED APPLICATIONS

The present application is the U.S. National Stage of International Application No. PCT/CN2021/101384, filed on Jun. 22, 2021, which claims priority to Chinese Patent Application No. 202010784431.7, filed on Aug. 6, 2020, and entitled "MOVEMENT EXTRACTION METHOD AND APPARATUS FOR DANCE VIDEO, COMPUTER DEVICE, AND STORAGE MEDIUM", both of which are incorporated herein by reference in their entireties.

TECHNICAL FIELD

The present application relates to the field of video processing technologies, and in particular to a movement extraction method and apparatus for a dance video, a computer device, and a storage medium.

BACKGROUND ART

Conventional somatosensory dancing games are generally produced and have their songs updated by the official side. Dance movements are manually selected, and a corresponding dance movement sequence is created for comparison with actual movements of users, to implement scoring, competition, and other interactive game content.

In order to meet individual needs of users, some game providers allow the users to upload their own recorded dance videos, and create dance movement sequences based on the videos uploaded by the users. There are a large number of game users, and each user may have multiple needs. Therefore, the inventors realized that simply relying on manual selection of dance movements and creation of standard movement sequences takes up a lot of human resources, and affects the efficiency in conversion of dance videos into dance movement sequences.

SUMMARY OF THE INVENTION

An objective of the present application is to provide a technical solution that can efficiently and accurately convert a dance video uploaded by a user into standard game movements, to solve the foregoing problem.

To achieve the foregoing objective, the present application provides a movement extraction method for a dance video. The method includes the following steps:
  receiving a dance video that includes one or more dancers and that is uploaded by a user, and obtaining a video frame in the dance video;
  recognizing, based on a skeleton node recognition algorithm, a skeleton node image included in the video frame and corresponding to a target dancer, where the target dancer is selected from the one or more dancers;
  performing cluster analysis on all skeleton node images included in the dance video and corresponding to each target dancer, to obtain a plurality of cluster sets;
  obtaining a key skeleton node image as a cluster center in each of the cluster sets; and
  sequentially outputting the key skeleton node images, to obtain a standard movement sequence corresponding to each target dancer in the dance video.

According to the movement extraction method for a dance video provided by the present application, the dance video includes a plurality of dancers, and the target dancer is one selected from the plurality of dancers.

According to the movement extraction method provided by the present application, the step of extracting, based on a skeleton node recognition algorithm, a skeleton node image included in the video frame and corresponding to a target dancer includes:
  determining a skeleton node model; and
  extracting a skeleton node image corresponding to the target dancer from the video frame based on the determined skeleton node model, where the skeleton node image includes a plurality of pieces of skeleton node data.

According to the movement extraction method provided by the present application, the step of extracting, based on a skeleton node recognition algorithm, a skeleton node image included in the video frame and corresponding to a target dancer further includes:
  determining whether a number of skeleton nodes included in the skeleton node image is within a preset range, and if not, deleting the skeleton node image.

According to the movement extraction method provided by the present application, the step of performing cluster analysis on all skeleton node images included in the dance video and corresponding to each target dancer, to obtain a plurality of cluster sets includes:
  randomly selecting K target skeleton node images from all the skeleton node images, and calculating similarities between each remaining skeleton node image and the target skeleton node images;
  putting the remaining skeleton node image and a corresponding target skeleton node image with the smallest similarity into one set to obtain K candidate sets;
  determining a new target skeleton node image based on identification numbers of skeleton node images included in each of the candidate sets, and repeating the calculation of the similarities based on K new target skeleton node images and the step of obtaining K candidate sets, where the identification numbers are used to uniquely represent an appearance order of the skeleton node images; and
  when identification numbers of the new target skeleton node images no longer change or a preset number of repetitions is reached, using the obtained K candidate sets as the cluster sets.

According to the movement extraction method provided by the present application, the K target skeleton node images are determined based on a rhythm of the dance video.

According to the movement extraction method provided by the present application, the similarity includes a Euclidean distance, and the step of calculating similarities between each remaining skeleton node image and the target skeleton node images includes:
  calculating a Euclidean distance between each skeleton node in the remaining skeleton node image and a corresponding skeleton node in the target skeleton node image; and
  using a sum of Euclidean distances for all skeleton nodes as a Euclidean distance between the remaining skeleton node image and the target skeleton node image.

According to the movement extraction method provided by the present application, the step of determining a new target skeleton node image based on identification numbers of skeleton node images included in each of the candidate sets includes:

obtaining an identification number of each skeleton node image included in each cluster set;

averaging and rounding the identification numbers of all the skeleton node images included in each data set to obtain a target identification number; and using a skeleton node image corresponding to the target identification number as the new target skeleton node image.

According to the movement extraction method provided by the present application, the step of extracting a key skeleton node image as a cluster center in each of the cluster sets includes:

calculating a difference between identification numbers of any two adjacent key skeleton node images; and when the difference is less than a first threshold, deleting the key skeleton node image with the later identification number.

To achieve the foregoing objective, the present application further provides a movement extraction apparatus for a dance video. The apparatus includes:

a video receiving module adapted to receive a dance video that includes one or more dancers and that is uploaded by a user, and obtain a video frame in the dance video;

a skeleton node recognition module adapted to recognize, based on a skeleton node recognition algorithm, a skeleton node image included in the video frame and corresponding to a target dancer, where the target dancer is selected from the one or more dancers;

a clustering module adapted to perform cluster analysis on all skeleton node images included in the dance video and corresponding to each target dancer, to obtain a plurality of cluster sets;

a key image obtaining module adapted to obtain a key skeleton node image as a cluster center in each of the cluster sets; and a movement output module adapted to sequentially output the key skeleton node images, to obtain a standard movement sequence corresponding to each target dancer in the dance video.

To achieve the foregoing objective, the present application further provides a computer device, including a memory, a processor, and computer-readable instructions stored on the memory and executable on the processor, where when executing the computer-readable instructions, the processor implements the following steps:

receiving a dance video that includes one or more dancers and that is uploaded by a user, and obtaining a video frame in the dance video;

recognizing, based on a skeleton node recognition algorithm, a skeleton node image included in the video frame and corresponding to a target dancer, where the target dancer is selected from the one or more dancers;

performing cluster analysis on all skeleton node images included in the dance video and corresponding to each target dancer, to obtain a plurality of cluster sets;

obtaining a key skeleton node image as a cluster center in each of the cluster sets; and sequentially outputting the key skeleton node images, to obtain a standard movement sequence corresponding to each target dancer in the dance video.

To achieve the foregoing objective, the present application further provides a computer-readable storage medium having stored thereon computer-readable instructions, where when the computer-readable instructions are executed by a processor, the following steps are implemented:

receiving a dance video that includes one or more dancers and that is uploaded by a user, and obtaining a video frame in the dance video;

recognizing, based on a skeleton node recognition algorithm, a skeleton node image included in the video frame and corresponding to a target dancer, where the target dancer is selected from the one or more dancers;

performing cluster analysis on all skeleton node images included in the dance video and corresponding to each target dancer, to obtain a plurality of cluster sets;

obtaining a key skeleton node image as a cluster center in each of the cluster sets; and sequentially outputting the key skeleton node images, to obtain a standard movement sequence corresponding to each target dancer in the dance video.

According to the movement extraction method and apparatus for a dance video, the computer device, and the computer-readable storage medium provided by the present application, standard movements may be quickly extracted based on the dance video uploaded by the user, and output to a client, so that a game player performs corresponding somatosensory operations according to the standard movements, to implement human-computer interaction or network interaction between a plurality of users. Specifically, in the present application, the skeleton node image is extracted from each frame of the dance video based on the skeleton node recognition algorithm, so that different postures of a dancer can be accurately recognized. The key skeleton node images are selected from all the skeleton node images based on the clustering algorithm, which can not only ensure the integrity of the standard movements, but can also avoid excessively dense movements that increase the difficulty of the game or affect scoring, ensuring that the user obtains a good gaming experience.

DETAILED DESCRIPTION OF EMBODIMENTS

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

According to the movement extraction method and apparatus for a dance video, the computer device, and the computer-readable storage medium provided by the present application, standard movements may be quickly extracted based on the dance video uploaded by the user, and output to a client, so that a game player performs corresponding somatosensory operations according to the standard movements, to implement human-computer interaction or network interaction between a plurality of users. Specifically, in the present application, the skeleton node image is extracted from each frame of the dance video based on the skeleton node recognition algorithm, so that different postures of a dancer can be accurately recognized. The key skeleton node images are selected from all the skeleton node images based on the clustering algorithm, which can not only ensure the integrity of the standard movements, but can also avoid excessively dense movements that increase the difficulty of the game or affect scoring, ensuring that the user obtains a good gaming experience.

Embodiment 1

Figure 1:
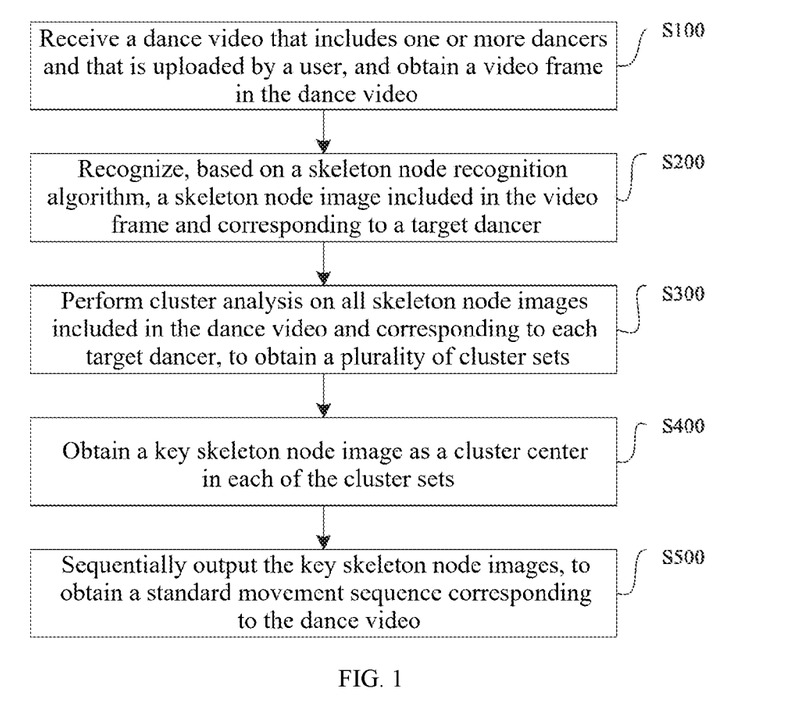
FIG. 1 is a flowchart of Embodiment 1 of a movement extraction method for a dance video according to the present application.

Referring to FIG. 1, this embodiment proposes a movement extraction method for a dance video. The method includes the following steps.

S100: Receive a dance video that includes one or more dancers and that is uploaded by a user, and obtain a video frame in the dance video.

The dance video in this embodiment is a video that clearly and completely presents a set of dance movements completed by a dancer. To reduce the difficulty of recognition, the dance video in this embodiment preferably includes one or two dancers.

It may be understood that a dance video is composed of a plurality of video frames. For example, a clip of 60-second video with a corresponding frame rate of 20 frames per second includes a total of 1,200 frames. In this step, after the dance video is received, the dance video is converted into all video frames.

S200: Recognize, based on a skeleton node recognition algorithm, a skeleton node image included in the video frame and corresponding to a target dancer, where the target dancer is selected from the one or more dancers.

The target dancer in this embodiment is a dancer who is an object of dance movement recognition. There may be one or more target dancers. When there is one target dancer, a dancer at a specific position (for example, on the front side or the left side) may be used as the target dancer, or a dancer designated by the user may be used as the target dancer. When there are a plurality of target dancers, all the dancers in the dance video may be used as the target dancers, or several dancers among them at specific positions may be used as the target dancers, which is not limited in the present application.

It may be understood that the dance movements reflect different body postures of the dancer at different times, where the body postures can be determined by positions of skeleton nodes. In this embodiment, any existing skeleton node recognition algorithm may be used to recognize skeleton nodes in each video frame. For example, any one of a 15-skeleton node model, an 18-skeleton node model, or a 25-skeleton node model may be used to recognize skeleton nodes. The numbers 15, 18, and 25 above each represent a number of skeleton nodes. A larger number of skeleton nodes indicates a higher recognition accuracy, and also more computing resources to be occupied. During specific implementation, different skeleton node models can be flexibly selected depending on a number of dance videos to be processed and a configuration of a server.

It should be noted that skeleton node images extracted in this step are for the same dancer. When a plurality of dancers are included in a video, rhythms of movements of different dancers are more or less different, while rhythms of the same dancer are often consistent. To ensure the accuracy of dance movements, in this embodiment, a group of skeleton node images are extracted for the same dancer, and each group of skeleton node images are used to generate one standard movement sequence. It may be understood that when there are a plurality of target dancers, in the present application, a group of corresponding skeleton node images are extracted for each target dancer, so as to generate a standard movement sequence corresponding to each target dancer. In this way, different players can make corresponding dance movements according to standard movement sequences of different target dancers based on their preferences, thereby improving the game experience.

S300: Perform cluster analysis on all skeleton node images included in the dance video and corresponding to each target dancer, to obtain a plurality of cluster sets.

The cluster analysis in this step is intended to divide all the skeleton node images into a plurality of similar sets based on a position relationship of different skeleton nodes, so that a cluster center for each set can represent a key frame for a standard movement. The cluster analysis may be performed using any existing clustering algorithm, such as a k-means clustering algorithm, a mean shift clustering algorithm, a density-based clustering algorithm, a Gaussian mixture model clustering algorithm, or an agglomerative hierarchical clustering algorithm. This is not limited in this embodiment.

S400: Obtain a key skeleton node image as a cluster center in each of the cluster sets.

It should be noted that this embodiment is intended to extract all key movements of a dancer from a complex dance video and output them sequentially, where each of the key movements is represented by a corresponding skeleton node image. Therefore, in this step, after the plurality of cluster sets are obtained, one skeleton node image is selected from each cluster set and used as a key movement for standard movements to be output. An appropriate skeleton node image may be selected from each cluster set using a plurality of methods. For example, a skeleton node image at a fixed position in each cluster set, or a skeleton node image as a cluster center, or the like is selected. The skeleton node image selected to output the key movement in each cluster set is the key skeleton node image.

S500: Sequentially output the key skeleton node images, to obtain a standard movement sequence corresponding to each target dancer in the dance video.

As mentioned above, each skeleton node image represents positions of the skeleton nodes of the body at the current time. Therefore, movement positions of different skeleton nodes at different times, that is, the standard movement sequence corresponding to the dance video, can be obtained by sequentially outputting the determined key skeleton node images.

In conclusion, in this embodiment, a human skeleton node image for each frame in the dance video is recognized using a relatively common skeleton recognition technology in the field of computer vision, and cluster analysis is performed on all skeleton node images, so as to rapidly determine key frames in the dance video. In this embodiment, the dance video uploaded by the user can be automatically converted into game standard movements, which not only reduces huge manpower expenditure, but also greatly improves conversion efficiency. In this way, the content of songs and levels in the dance game can be rapidly expanded, and user experience can be improved.

Figure 2:
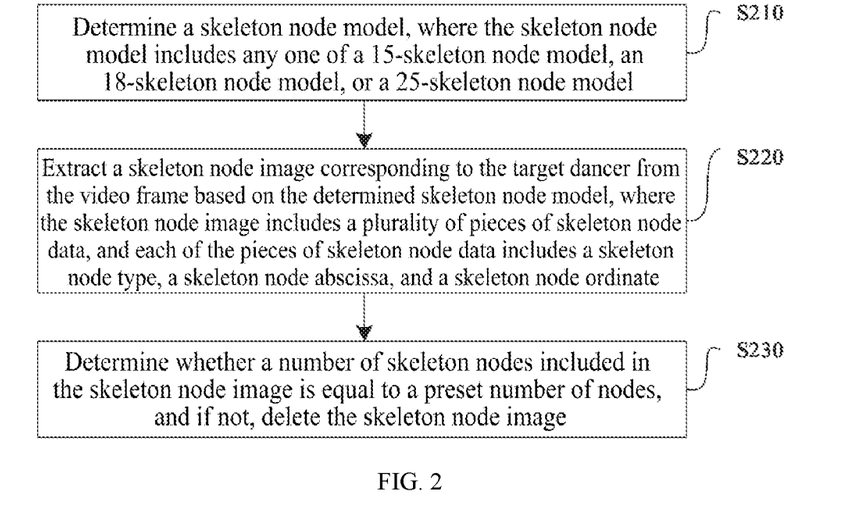
FIG. 2 is a schematic flowchart of extracting a skeleton node image in Embodiment 1 of the present application.

FIG. 2 is a schematic flowchart of step S200 of recognizing, based on a skeleton node recognition algorithm, a skeleton node image included in the video frame and corresponding to a target dancer. As shown in FIG. 2, step S200 includes the following steps.

S210: Determine a skeleton node model, where the skeleton node model includes any one of a 15-skeleton node model, an 18-skeleton node model, or a 25-skeleton node model.

Figure 3:
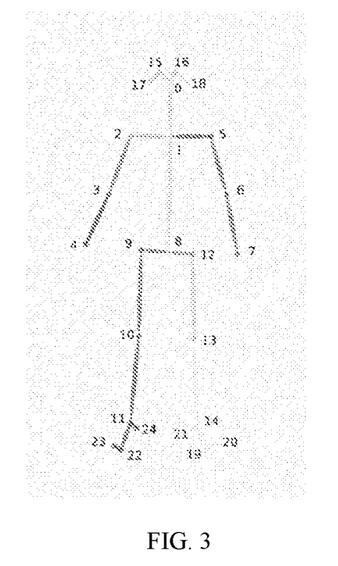
FIG. 3 is a schematic diagram of a 25-skeleton node model in Embodiment 1 of a movement extraction method for a dance video according to the present application.

FIG. 3 is a schematic diagram of a 25-skeleton node model. As shown in FIG. 3, 25 skeleton nodes here respectively include a nose node, a neck node, a left shoulder node, a right shoulder node, a left elbow node, a right elbow node, a left hand node, a right hand node, a left eye node, a right eye node, a left ear node, a right ear node, a lower hip middle node, a lower hip left node, a lower hip right node, a left knee node, a right knee node, a left ankle node, a right ankle node, a left big toe node, a right big toe node, a left little toe node, a right little toe node, a left heel node, and a right heel node.

S220: Extract a skeleton node image corresponding to the target dancer from the video frame based on the determined skeleton node model, where the skeleton node image includes a plurality of pieces of skeleton node data, and each of the pieces of skeleton node data includes a skeleton node type, a skeleton node abscissa, and a skeleton node ordinate.

The 25-skeleton node model shown in FIG. 3 is still taken as an example. Extracting the skeleton node image from the video frame is obtaining skeleton node data of a specific dancer corresponding to the 25 skeleton nodes and included in the video frame. Specifically, each piece of skeleton node data may include a skeleton node type, a skeleton node abscissa, and a skeleton node ordinate. The skeleton node type indicates a specific node, such as a left shoulder node, a right shoulder node, or a left hand node. The abscissa and the ordinate indicate position data of the skeleton node in the skeleton node image. In this way, respective positions of the 25 skeleton nodes can be determined based on the node type, the node abscissa, and the node ordinate of each skeleton node, so that a movement of the dancer can be determined based on the positions of the skeleton nodes.

S230: Determine whether a number of skeleton nodes included in the skeleton node image is within a preset range, and if not, delete the skeleton node image.

It may be understood that in the opening and ending sections of the video or due to blocking, shooting angle, and other reasons, it is possible that no dancer is present in a video frame, or that a dancer's body is partially blocked. In this case, all the 25 pieces of skeleton node data cannot be obtained, and less than 25 pieces of skeleton node data or even no skeleton node data may be obtained. Therefore, to ensure the clarity and integrity of the output movements, the skeleton node image whose number of skeleton nodes is not within the preset range is deleted in this step. The preset range here may be set based on a maximum number of skeleton nodes that can be recognized by the skeleton node model. For example, if the maximum number of skeleton nodes is 25, then the preset range may be set to [18, 25].

Through the foregoing steps, an accurate and complete skeleton node image can be obtained in this embodiment, which provides a good foundation for the subsequent output of standard movements.

Figure 4:
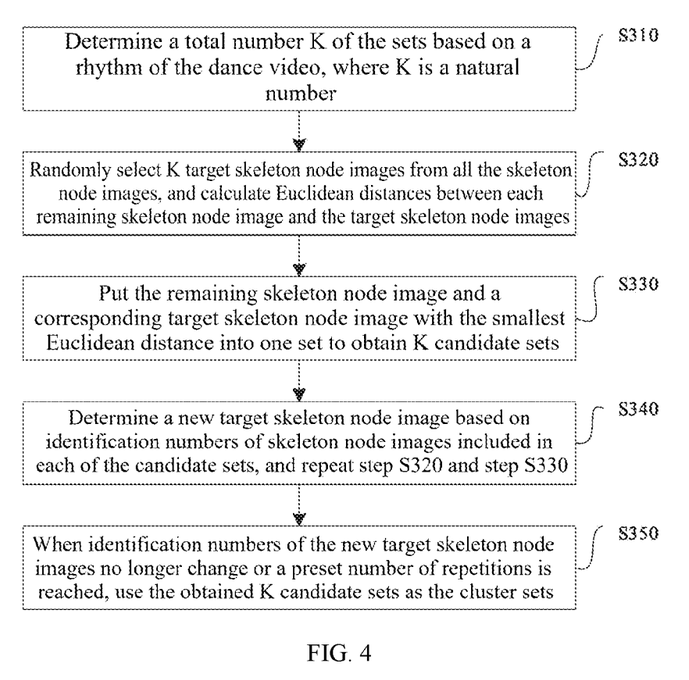
FIG. 4 is a schematic flowchart of performing cluster analysis on skeleton node images in Embodiment 1 of the present application.

FIG. 4 is a schematic flowchart of performing cluster analysis on skeleton node images in Embodiment 1 of the present application. As shown in FIG. 4, step S300 includes the following steps.

S310: Determine a total number K of the sets based on a rhythm of the dance video, where K is a natural number.

Determining the total number of the cluster sets in this step is intended to determine a number of the key skeleton node images used as key frames for the standard movements to be finally output. In other words, one cluster set finally corresponds to one key skeleton node image.

It may be understood that if the output standard movements include too many key frames, the movements appear very dense during the game, and it may be difficult for an average player to complete the corresponding dance movements in time. On the contrary, if the number of the key frames is too small, the player is often in an "idle" state, and it is difficult to widen the gap between the performances of different players in this embodiment. These are both detrimental to a good game experience. After an analysis of movement sequences of songs in a plurality of dance games, in this embodiment, preferably, one key frame is output every 1.5 seconds on average, which is a more appropriate extraction frequency.

The total number K of the key frames, that is, the total number K of the cluster sets may be determined based on the extraction frequency. For example, if duration of a video is 60 seconds, then K=60÷1.5=40. In addition, considering that songs for different dances have different rhythms, especially for fast songs and slow songs, there is a relatively large gap between frequencies at which key dance movements appear. In view of this, in this embodiment, the extraction frequency can also be automatically adjusted depending on rhythms, or the user is allowed to actively adjust the number of the key frames. For example, the user may select one key frame from an interval of 0.5 seconds to 3 seconds on average. In this way, for some dance songs with special rhythms, the number of the extracted key frames can also be adjusted accordingly to adapt to the rhythm of the video and the song.

S320: Randomly select K target skeleton node images from all the skeleton node images, and calculate similarities between each remaining skeleton node image and the target skeleton node images.

It is assumed that the number of all the skeleton node images is 100 in total, the skeleton node images may be represented as F1, F2, . . . , F100, respectively, and K=10. In this step, 10 images are randomly selected therefrom as the target skeleton node images, which are assumed to be F1, F2, . . . , F10, and then the remaining skeleton node images include F11, F12, . . . , F100. Certainly, to prevent the selected target skeleton node images from being too concentrated, the target skeleton node images may also be selected according to a specific time interval. For example, one target skeleton node image is extracted every second.

Figure 5:
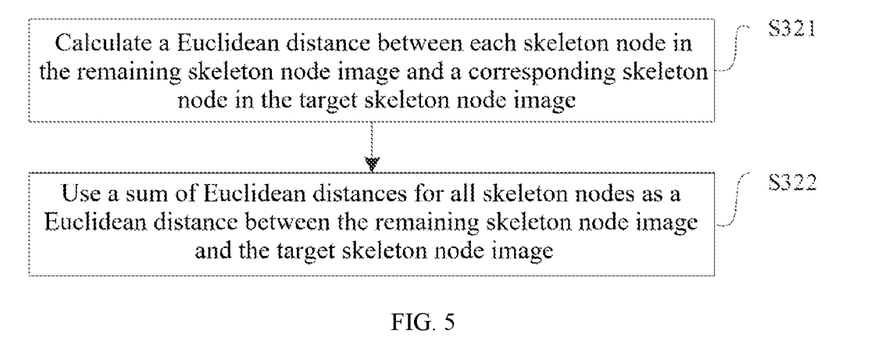
FIG. 5 is a schematic flowchart of calculating a Euclidean distance in Embodiment 1 of the present application.

In an example, the similarity between the remaining skeleton node image and the target skeleton node image may include Euclidean distances between skeleton nodes in the remaining skeleton node image and skeleton nodes in the target skeleton node image. In this example, specific steps of calculating the similarity are shown in FIG. 5, including:

S321: calculating a Euclidean distance between each skeleton node in the remaining skeleton node image and a corresponding skeleton node in the target skeleton node image; and S322: using a sum of Euclidean distances for all skeleton nodes as a Euclidean distance between the remaining skeleton node image and the target skeleton node image.

The Euclidean distances between each remaining skeleton node image and the target skeleton node images are calculated, that is, Euclidean distances between each of F11, F12, ..., F100 and F1, F2, ..., F10 are separately calculated. It is assumed that FA represents any one of the remaining skeleton node images F11, F12, ..., F100, and FB represents any one of the target skeleton node images F1, F2, ..., F10. n skeleton nodes included in FA may be represented as A1, A2, ..., An, and n skeleton nodes included in FB may be represented as B1, B2, ..., Bn, where n may be 15, 18 or 25. Then a Euclidean distance, Similarity (F11, F1), between F11 and F1 may be expressed as:

Similarity $(FA,FB)=d(B1,A1)+d(B2,A2)+\ldots d(Bm,Am)+\ldots+d(Bn,An)$

In the above formula, d(Bm, Am) represents a distance between an $m^{th}$ skeleton node Bm and an $m^{th}$ skeleton node Am, and d(Bm, Am)=$\sqrt{(X_{Bm}-X_{Am})^2+(Y_{Bm}-Y_{Am})^2}$. $(X_{Am}, Y_{Am})$ and $(X_{Bm}, Y_{Bm})$ are the abscissa and ordinate of the skeleton node Am and the abscissa and ordinate of the skeleton node Bm, respectively.

Similarly, a Euclidean distance, Similarity (F11, F2), between F11 and F2, a Euclidean distance, Similarity (F11, F3), between F11 and F3, ..., and a Euclidean distance, Similarity (F11, F10), between F11 and F10 are also calculated according to the above formula.

S330: Put the remaining skeleton node image and a corresponding target skeleton node image with the similarity into one set to obtain K candidate sets.

As shown in the above example, after the Euclidean distance between F11 and each target skeleton node image is obtained, a value of the smallest Euclidean distance is selected therefrom, and F11 and a skeleton node image corresponding to the smallest Euclidean distance are put into one cluster set. For example, if it is determined through calculation that a Euclidean distance between F11 and F5 is the smallest, then F11 is put into a cluster set of F5.

S340: Determine a new target skeleton node image based on identification numbers of skeleton node images included in each of the candidate sets, and repeat step S320 and step S330, where the identification numbers are used to uniquely represent an appearance order of the skeleton node images.

Figure 6:
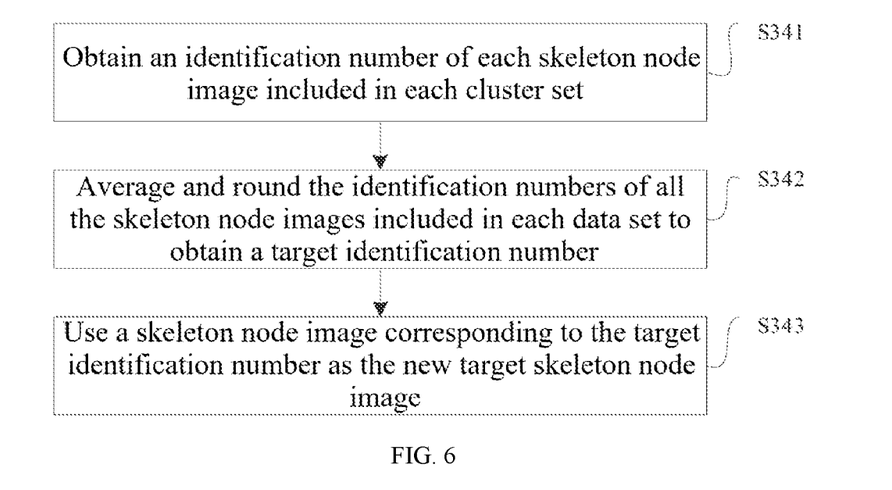
FIG. 6 is a schematic flowchart of determining a new target skeleton node image in Embodiment 1 of the present application.

As described in step S320, the initial target skeleton node images are randomly selected, and these initial target skeleton node images are probably not suitable to be used as an ideal classification reference. Therefore, it is necessary to repeatedly determine a new target skeleton node image, so as to obtain an optimal target. FIG. 6 is a schematic flowchart of determining a new target skeleton node image in Embodiment 1 of the present application. As shown in FIG. 6, step S340 includes the following steps.

S341: Obtain an identification number of each skeleton node image included in each cluster set.

In this embodiment, each skeleton node image corresponds to a unique identification number, which is used to represent an appearance order of the skeleton node image. As mentioned above, a skeleton node image is extracted from a corresponding video frame, and each video frame has a unique sequence number in the dance video. Therefore, the sequence number of the corresponding video frame may be used as a sequence number of the skeleton node image in this embodiment. For example, for the skeleton node images F1, F2, ..., F100 mentioned above, the numbers 1 to 100 here are the identification numbers corresponding to all the skeleton node images. For example, it is known that skeleton node images in a candidate set V include F1, F10, F20, and F30, and then the identification numbers here are: 1, 10, 20, and 30.

S342: Average and round the identification numbers of all the skeleton node images included in each data set to obtain a target identification number.

Taking the foregoing set V as an example, the known identification numbers include 1, 10, 20, and 30. The identification numbers are averaged as (1+10+20+30)÷4, which, if not divisible, is rounded to a nearest integer, and then a target identification number corresponding to the set V being 15 can be obtained.

S343: Use a skeleton node image corresponding to the target identification number as the new target skeleton node image.

When it is determined that the target identification number is 15, the corresponding skeleton node image is F15, and then F15 is the new target skeleton node image. Since there are K candidate sets in total in this embodiment, K new target skeleton node images can be obtained accordingly.

S350: When identification numbers of the new target skeleton node images no longer change or a preset number of repetitions is reached, use the obtained K candidate sets as the cluster sets.

Figure 7:
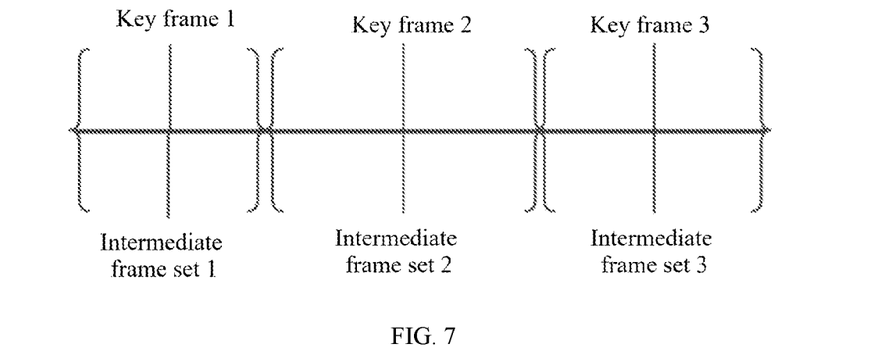
FIG. 7 is a schematic diagram of selecting a cluster center as a key frame in Embodiment 1 of the present application.

This step specifies an iteration termination condition for the cluster analysis. It may be understood that when different target skeleton node images are used as cluster centers, different cluster sets are obtained. FIG. 7 is a schematic diagram of selecting a cluster center as a key frame in Embodiment 1 of the present application. In FIG. 7, an intermediate frame set 1, an intermediate frame set 2, and an intermediate frame set 3 represent three cluster sets, and a key frame 1, a key frame 2, and a key frame 3 respectively represent cluster centers of the cluster sets. Ideally, the target skeleton node images no longer change after a plurality of iterations, so that cluster sets with stable and accurate classification are obtained. Certainly, in an actual operation process, if there is a large amount of data, it may be difficult to achieve the situation that the target skeleton node images no longer change. In this case, the iteration may be terminated by setting a limited number of repetitions, such as 100 times. Each time K new target skeleton node images are determined, one repetition is completed.

Through the foregoing steps, it can be ensured that the K candidate sets obtained in this embodiment have relatively high accuracy, so that relatively similar movements can be classified into the same set, and relatively different movements can be classified into different sets.

Figure 8:
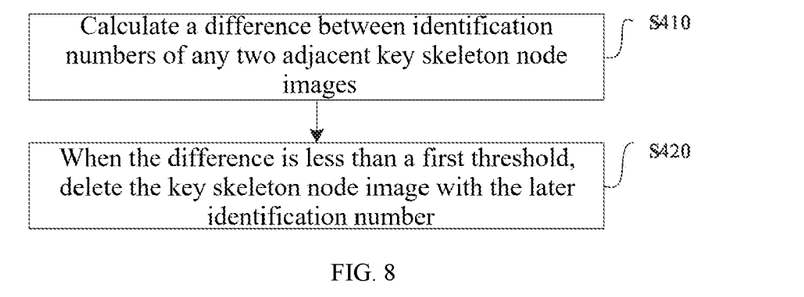
FIG. 8 is a schematic flowchart of reducing duplicate key skeleton node images in Embodiment 1 of the present application.

As mentioned above, step S400 is used to obtain the key skeleton node image that is used as the cluster center in each of the cluster sets. During an actual operation, there may be duplications between adjacent key skeleton node images with a short time interval, which is usually caused by a relatively slow rhythm of movement changes. To avoid interference to the user, in an example, the duplicate key skeleton node images are reduced. As shown in FIG. 8, step S400 specifically includes the following steps.

S410: Calculate a difference between identification numbers of any two adjacent key skeleton node images.

As mentioned above, the identification number n of the skeleton node image corresponds to the sequence number N of the corresponding video frame, and the sequence number N of the video frame may represent the chronological appearance order of the video frame in the dance video. Usually, the identification number n or the sequence number N is arranged according to the order of natural numbers, and the dance video has a fixed frame rate f, that is, the number of video frames played per second. As such, the identification number n divided by the frame rate f is a time at which a skeleton node image appears in an output standard movement video. For example, if the frame rate is 20 frames per second, and a skeleton node image is F50, that is, the identification number n=50, then it is equivalent to that the skeleton node image F50 appears at the 50÷20=2.5th second.

To ensure that the change of the output standard movements is within the range of normal human reaction, a time interval between two adjacent key skeleton node images cannot be too short; otherwise, the user has no enough time to respond, and the change of the movements is not obvious enough. It is assumed that the shortest interval between two adjacent key skeleton node images is I, and because different videos have different frame rates, the interval I may be limited based on the total duration of the dance video. Generally, the shortest response time t for adults to the change between two images is 0.2 seconds. If a frame rate of a dance video is f, then the shortest interval I is:

$$I = f * t$$

Assuming t=0.2 seconds, and f is 25 frames per second, then the shortest interval is 5 frames. In this case, the number 5 is the difference between the identification numbers of the two adjacent key skeleton node images.

S420: When the difference is less than a first threshold, delete the key skeleton node image with the later identification number.

In this example, key skeleton node images obtained using the k-means clustering algorithm may be traversed one by one. When a difference between identification numbers of two consecutive key skeleton node images is less than a preset difference (for example, 5), the key skeleton node image with the later identification number is removed from a result set. The foregoing operations are repeated until intervals between all adjacent key skeleton node images meet the foregoing condition. In this way, redundant content in the key skeleton node images can be effectively removed, so that the extraction of the dance movements is more representative.

Figure 9:
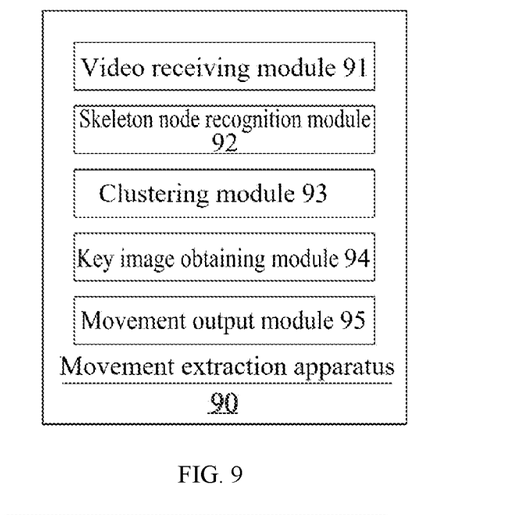
FIG. 9 is a schematic diagram of program modules of Embodiment 1 of a movement extraction apparatus for a dance video according to the present application.

Referring further to FIG. 9, which shows a movement extraction apparatus for a dance video, in this embodiment, the movement extraction apparatus 90 may include or be divided into one or more program modules, and the one or more program modules are stored in a storage medium and executed by one or more processors to implement the present application and the foregoing movement extraction method. The program modules mentioned in the present application refer to a series of computer-readable instruction segments that can complete specific functions, and are more suitable than the program to describe an execution process of the movement extraction apparatus 90 in the storage medium. Functions of the program modules in this embodiment are described in detail in the following description.

A video receiving module 91 is adapted to receive a dance video that includes a target dancer and that is uploaded by a user, and obtain a video frame in the dance video.

A skeleton node recognition module 92 is adapted to recognize, based on a skeleton node recognition algorithm, a skeleton node image included in the video frame and corresponding to the target dancer.

A clustering module 93 is adapted to perform cluster analysis on all skeleton node images included in the dance video, to obtain a plurality of cluster sets.

A key image obtaining module 94 is adapted to obtain a key skeleton node image as a cluster center in each of the cluster sets.

A movement output module 95 is adapted to sequentially output the key skeleton node images, to obtain standard movements corresponding to the dance video.

Figure 10:
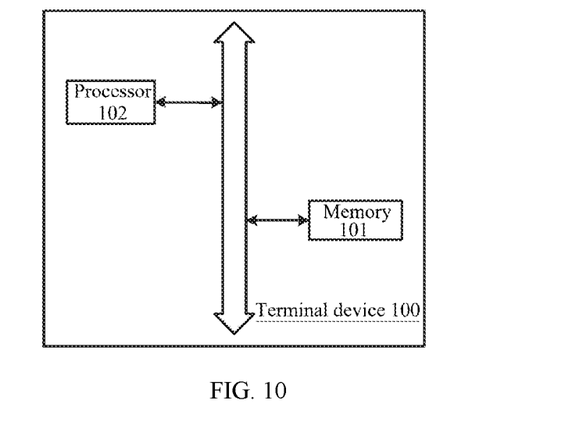
FIG. 10 is a schematic diagram of a hardware structure of Embodiment 1 of a movement extraction apparatus for a dance video according to the present application.

This embodiment further provides a computer device, such as a smartphone, a tablet computer, a notebook computer, a desktop computer, a rack server, a blade server, a tower server, or a cabinet server (including a standalone server or a server cluster consisting of a plurality of servers) that can execute a program. The computer device 100 in this embodiment at least includes but is not limited to: a memory 101 and a processor 102 that can be communicatively connected to each other by using a system bus, as shown in FIG. 10. It should be noted that FIG. 10 shows only the computer device 100 having components 101 and 102, but it should be understood that not all of the shown components are necessarily implemented, and more or fewer components may be implemented instead.

In this embodiment, the memory 101 (namely, a readable storage medium) includes a flash memory, a hard disk, a multimedia card, a card-type memory (e.g., an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 101 may be an internal storage unit of the computer device 100, for example, a hard disk or a memory of the computer device 100. In some other embodiments, the memory 101 may alternatively be an external storage device of the computer device 100, for example, a plug-in hard disk provided on the computer device 100, a smart media card (SMC), a secure digital (SD) card, or a flash card. Certainly, the memory 101 may alternatively include both an internal storage unit of the computer device 100 and an external storage device thereof. In this embodiment, the memory 101 is generally configured to store an operating system and various types of application software installed on the computer device 100, such as the program code for the movement extraction apparatus 90 in Embodiment 1. In addition, the memory 101 may be further configured to temporarily store various types of data that have been output or are to be output.

The processor 102 may be, in some embodiments, a central processing unit (CPU), a controller, a microcontroller, a microprocessor, or other data processing chips. The processor 102 is generally configured to control overall operations of the computer device 100. In this embodiment, the processor 102 is configured to run program code or processing data stored in the memory 101, for example, to run the movement extraction apparatus 90 to implement the movement extraction method in Embodiment 1.

This embodiment further provides a computer-readable storage medium, such as a flash memory, a hard disk, a multimedia card, a card-type memory (e.g., an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, a server, or an App store. The computer-readable storage medium stores computer-readable instructions, and when the program is executed by a processor, corresponding functions are performed. The computer-readable storage medium in this embodiment is configured to store the movement extraction apparatus 90, where when the movement extraction apparatus is executed by a processor, the following steps are implemented:

receiving a dance video that includes one or more dancers and that is uploaded by a user, and obtaining a video frame in the dance video;

recognizing, based on a skeleton node recognition algorithm, a skeleton node image included in the video frame and corresponding to a target dancer, where the target dancer is selected from the one or more dancers;

performing cluster analysis on all skeleton node images included in the dance video and corresponding to each target dancer, to obtain a plurality of cluster sets;

obtaining a key skeleton node image as a cluster center in each of the cluster sets; and sequentially outputting the key skeleton node images, to obtain a standard movement sequence corresponding to each target dancer in the dance video.

The serial numbers of the foregoing embodiments of the present application are merely for description, and do not represent the superiority or inferiority of the embodiments.

Any process or method described in the flowcharts or otherwise described herein may be understood as including one or more modules, segments, or sections of code of executable instructions for implementing specific logical functions or steps; and the scope of the preferred implementations of the present application includes alternative implementations in which the functions may be performed out of the order shown or discussed, including performing the functions substantially concurrently or in the reverse order depending on the functions involved, which should be understood by those skilled in the art to which the embodiments of the present application pertain.

Those of ordinary skill in the art can understand that all or some of the steps carried in the method of the foregoing embodiment may be completed by a program instructing related hardware. The program may be stored in a computer-readable medium. The program, when executed, may include one of or a combination of the steps of the method embodiment.

In the description of this specification, the description with reference to the terms such as "an embodiment", "some embodiments", "an example", "a specific example", or "some examples" means that specific features, structures, materials, or characteristics described in combination with the embodiments or examples are included in at least one embodiment or example of this application. In this specification, the schematic expressions of the above terms do not necessarily refer to the same embodiments or examples. Furthermore, the specific features, structures, materials, or characteristics described may be combined in a suitable manner in any one or more embodiments or examples.

Through the description of the above implementations, those skilled in the art can clearly understand that the methods of the foregoing embodiments can be implemented by software and necessary general hardware platforms. Definitely, the methods of the foregoing embodiments can also be implemented by hardware. However, in many cases, the former implementation is preferred.

The foregoing descriptions are merely preferred embodiments of the present application, and are not intended to limit the patent scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A method of extracting movements from a dance video, comprising:

receiving a dance video that comprises one or more dancers and that is uploaded by a user, and obtaining video frames in the dance video;

recognizing, based on a skeleton node recognition algorithm, skeleton node images from the video frames corresponding to each target dancer selected from the one or more dancers in the dance video, each of the skeleton node images is associated with an identification number, and identification numbers of the skeleton node images indicate a chronological order of video frames in the dance video from which the skeleton node images are generated;

performing cluster analysis on the skeleton node images recognized from the dance video and corresponding to each target dancer to obtain a plurality of cluster sets, wherein the performing cluster analysis on the skeleton node images corresponding to each target dancer to obtain a plurality of cluster sets comprises:

selecting K target skeleton node images from all the skeleton node images, calculating similarities between each of remaining skeleton node images and the target skeleton node images, grouping each of the remaining skeleton node images and a corresponding target skeleton node image based on the calculated similarities to obtain K candidate sets, determining a new target skeleton node image based on identification numbers of skeleton node images comprised in each of the K candidate sets, repeating calculation of similarities based on K new target skeleton node images and obtaining K new candidate sets, and in response to determining that identification numbers of K new target skeleton node images no longer change or a preset number of repetitions is reached, identifying K new candidate sets corresponding to the K new target skeleton node images as the plurality of cluster sets;

determining a cluster center in each of the plurality of cluster sets as a key skeleton node image; and sequentially outputting key skeleton node images to obtain a standard movement sequence corresponding to each target dancer in the dance video.

2. The method according to claim 1, wherein the dance video comprises a plurality of dancers, and the target dancer is one selected from the plurality of dancers.

3. The method according to claim 1, wherein the recognizing, based on a skeleton node recognition algorithm, skeleton node images from the video frames further comprises:
 determining a skeleton node model; and
 extracting the skeleton node images corresponding to the target dancer from the video frames based on the determined skeleton node model, wherein each of the skeleton node images comprises data associated with a plurality of skeleton nodes.

4. The method according to claim 3, wherein the recognizing, based on a skeleton node recognition algorithm, skeleton node images from the video frames further comprises:
 determining whether a number of skeleton nodes comprised in each of the skeleton node images is within a preset range, and deleting one or more skeleton node images when a number of skeleton nodes in each of the one or more skeleton node images is not within the preset range.

5. The method according to claim 1, wherein the K target skeleton node images are determined based on a rhythm of the dance video.

6. The method according to claim 1, wherein the similarities are determined based on Euclidean distances, and the calculating similarities between each of remaining skeleton node images and the target skeleton node images comprises:
 calculating a Euclidean distance between each skeleton node in each of the remaining skeleton node images and a corresponding skeleton node in each of the target skeleton node images; and
 determining a sum of Euclidean distances for all skeleton nodes as a Euclidean distance between each of the remaining skeleton node images and each of the target skeleton node images.

7. The method according to claim 1, wherein the determining a new target skeleton node image based on identification numbers of skeleton node images comprised in each of the K candidate sets comprises:
 obtaining an identification number of each skeleton node image comprised in each of the K candidate sets;
 averaging and rounding the identification numbers of all skeleton node images comprised in each of the K candidate sets to obtain a target identification number; and
 identifying a skeleton node image corresponding to the target identification number as the new target skeleton node image.

8. The method according to claim 1, further comprising:
 calculating a difference between identification numbers of any two adjacent key skeleton node images; and
 in response to determining that the difference is less than a first threshold, deleting one of the two adjacent key skeleton, the one of the two adjacent key skeleton node images associated with a later identification number.

9. A computing system, comprising a memory, a processor, and computer-readable instructions stored on the memory and executable on the processor, wherein when executing the computer-readable instructions, the processor implements operations comprising:
 receiving a dance video that comprises one or more dancers and that is uploaded by a user, and obtaining video frames in the dance video;
 recognizing, based on a skeleton node recognition algorithm, skeleton node images from the video frames corresponding to each target dancer selected from the one or more dancers in the dance video, each of the skeleton node images is associated with an identification number, and identification numbers of the skeleton node images indicate a chronological order of video frames in the dance video from which the skeleton node images are generated;
 performing cluster analysis on the skeleton node images recognized from the dance video and corresponding to each target dancer to obtain a plurality of cluster sets, wherein the performing cluster analysis on the skeleton node images corresponding to each target dancer to obtain a plurality of cluster sets comprises:
  selecting K target skeleton node images from all the skeleton node images,
  calculating similarities between each of remaining skeleton node images and the target skeleton node images,
  grouping each of the remaining skeleton node images and a corresponding target skeleton node image based on the calculated similarities to obtain K candidate sets,
  determining a new target skeleton node image based on identification numbers of skeleton node images comprised in each of the K candidate sets,
  repeating calculation of similarities based on K new target skeleton node images and obtaining K new candidate sets, and
  in response to determining that identification numbers of K new target skeleton node images no longer change or a preset number of repetitions is reached, identifying K new candidate sets corresponding to the K new target skeleton node images as the plurality of cluster sets;
 determining a cluster center in each of the plurality of cluster sets as a key skeleton node image; and
 sequentially outputting key skeleton node images to obtain a standard movement sequence corresponding to each target dancer in the dance video.

10. The computing system according to claim 9, wherein the dance video comprises a plurality of dancers, and the target dancer is one selected from the plurality of dancers.

11. The computing system according to claim 9, wherein the recognizing, based on a skeleton node recognition algorithm, skeleton node images from the video frames further comprises:
 determining a skeleton node model; and
 extracting the skeleton node images corresponding to the target dancer from the video frames based on the determined skeleton node model, wherein each of the skeleton node images comprises data associated with a plurality of skeleton nodes.

12. The computing system according to claim 11, wherein the recognizing, based on a skeleton node recognition algorithm, skeleton node images from the video frames further comprises:
 determining whether a number of skeleton nodes comprised in each of the skeleton node images is within a preset range, and deleting one or more skeleton node images when a number of skeleton nodes in each of the one or more skeleton node images is not within the preset range.

13. The computing system according to claim 9, wherein the K target skeleton node images are determined based on a rhythm of the dance video.

14. The computing system according to claim 9, wherein the similarities are determined based on Euclidean distances, and the calculating similarities between each of remaining skeleton node images and the target skeleton node images comprises:
- calculating a Euclidean distance between each skeleton node in each of the remaining skeleton node images and a corresponding skeleton node in each of the target skeleton node images; and
- determining a sum of Euclidean distances for all skeleton nodes as a Euclidean distance between each of the remaining skeleton node images and each of the target skeleton node images.

15. The computing system according to claim 9, wherein the determining a new target skeleton node image based on identification numbers of skeleton node images comprised in each of the K candidate sets comprises:
- obtaining an identification number of each skeleton node image comprised in each of the K candidate sets;
- averaging and rounding the identification numbers of all skeleton node images comprised in each of the K candidate sets to obtain a target identification number; and
- identifying a skeleton node image corresponding to the target identification number as the new target skeleton node image.

16. The computing system according to claim 9, the operations further comprising:
- calculating a difference between identification numbers of any two adjacent key skeleton node images; and
- in response to determining that the difference is less than a first threshold, deleting one of the two adjacent key skeleton, the one of the two adjacent key skeleton node images associated with a later identification number.

17. A non-transitory computer-readable storage medium having stored thereon computer-readable instructions, wherein when the computer-readable instructions are executed by a processor, the processor implements operations comprising:
- receiving a dance video that comprises one or more dancers and that is uploaded by a user, and obtaining video frames in the dance video;
- recognizing, based on a skeleton node recognition algorithm, skeleton node images from the video frames corresponding to a target dancer, wherein the target dancer is selected from the one or more dancers in the dance video, each of the skeleton node images is associated with an identification number, and identification numbers of the skeleton node images indicate a chronological order of video frames in the dance video from which the skeleton node images are generated;
- performing cluster analysis on the skeleton node images recognized from the dance video and corresponding to each target dancer to obtain a plurality of cluster sets, wherein the performing cluster analysis on the skeleton node images corresponding to each target dancer to obtain a plurality of cluster sets comprises:
  - selecting K target skeleton node images from all the skeleton node images,
  - calculating similarities between each of remaining skeleton node images and the target skeleton node images,
  - clustering each of the remaining skeleton node images and a corresponding target skeleton node image based on the calculated similarities to obtain K candidate sets,
  - determining a new target skeleton node image based on identification numbers of skeleton node images comprised in each of the K candidate sets,
  - repeating calculation of similarities based on K new target skeleton node images and obtaining K new candidate sets, and
  - in response to determining that identification numbers of K new target skeleton node images no longer change or a preset number of repetitions is reached, identifying K new candidate sets corresponding to the K new target skeleton node images as the plurality of cluster sets;
- determining a cluster center in each of the plurality of cluster sets as a key skeleton node image; and
- sequentially outputting key skeleton node images to obtain a standard movement sequence corresponding to each target dancer in the dance video.

18. The non-transitory computer-readable storage medium of claim 17, wherein the recognizing, based on a skeleton node recognition algorithm, skeleton node images from the video frames further comprises:
- determining a skeleton node model; and
- extracting the skeleton node images corresponding to each target dancer from the video frames based on the determined skeleton node model, wherein each of the skeleton node images comprises data associated with a plurality of skeleton nodes.

19. The non-transitory computer-readable storage medium of claim 17, wherein the recognizing, based on a skeleton node recognition algorithm, skeleton node images from the video frames further comprises:
- determining whether a number of skeleton nodes comprised in each of the skeleton node images is within a preset range, and deleting one or more skeleton node images when a number of skeleton nodes in each of the one or more skeleton node images is not within the preset range.

20. The non-transitory computer-readable storage medium of claim 17, the operations further comprising:
- calculating a difference between identification numbers of any two adjacent key skeleton node images; and
- in response to determining that the difference is less than a first threshold, deleting one of the two adjacent key skeleton, the one of the two adjacent key skeleton node images associated with a later identification number.

* * * * *